(12) United States Patent
Leung

(10) Patent No.: US 8,504,182 B2
(45) Date of Patent: Aug. 6, 2013

(54) MEDIA PLAYER

(75) Inventor: Wilson Wai Sing Leung, Hong Kong (CN)

(73) Assignee: Alco Electronics Limited, Quarry Bay, Hong Kong (CN)

( * ) Notice: Subject to any disclaimer, the term of this patent is extended or adjusted under 35 U.S.C. 154(b) by 992 days.

(21) Appl. No.: 12/544,460

(22) Filed: Aug. 20, 2009

(65) Prior Publication Data

US 2011/0046757 A1    Feb. 24, 2011

(51) Int. Cl.
*G06F 17/00* (2006.01)

(52) U.S. Cl.
USPC ............................ 700/94; 361/679.41

(58) Field of Classification Search
USPC ............................ 700/94; 361/679.41
See application file for complete search history.

(56) References Cited

U.S. PATENT DOCUMENTS

| | | | |
|---|---|---|---|
| 6,963,487 B2 | 11/2005 | Billington et al. | |
| 6,996,077 B1 | 2/2006 | Suenaga et al. | |
| 7,599,177 B2 | 10/2009 | Jaffe et al. | |
| 7,606,526 B2 | 10/2009 | Patsiokas et al. | |
| 7,624,955 B2 | 12/2009 | McGill | |
| 7,636,235 B2 | 12/2009 | Langberg et al. | |
| 2003/0223185 A1 | 12/2003 | Doczy et al. | |
| 2003/0235029 A1 | 12/2003 | Doherty et al. | |
| 2006/0013411 A1 | 1/2006 | Lin | |
| 2006/0043253 A1 | 3/2006 | Huang et al. | |
| 2006/0116009 A1* | 6/2006 | Langberg et al. | 439/76.1 |
| 2006/0280045 A1 | 12/2006 | Ritsher et al. | |
| 2007/0035917 A1 | 2/2007 | Hotelling et al. | |
| 2007/0288678 A1 | 12/2007 | Langberg et al. | |
| 2008/0006746 A1 | 1/2008 | Volochine | |
| 2008/0089547 A1 | 4/2008 | Young et al. | |
| 2008/0158411 A1 | 7/2008 | Firnberg | |
| 2009/0180660 A1 | 7/2009 | Groset et al. | |
| 2009/0219262 A1 | 9/2009 | Champion et al. | |
| 2011/0157801 A1 | 6/2011 | Satterfield | |
| 2011/0170256 A1 | 7/2011 | Lee | |
| 2012/0188689 A1 | 7/2012 | Leung | |
| 2012/0189156 A1 | 7/2012 | Leung | |

FOREIGN PATENT DOCUMENTS

| | | |
|---|---|---|
| CN | 2935379 Y | 8/2007 |
| CN | 201696820 U | 1/2011 |
| CN | 201696825 U | 1/2011 |
| DE | 203 18 230 U1 | 3/2004 |
| GB | 2 451 894 A | 2/2009 |
| WO | WO 2006/113585 A2 | 10/2006 |
| WO | WO 2006/130784 A2 | 12/2006 |

OTHER PUBLICATIONS

European Patent Office, Search Report in European Patent Application No. 10 25 1462 (Dec. 9, 2010).

* cited by examiner

*Primary Examiner* — Joseph Saunders, Jr.
(74) *Attorney, Agent, or Firm* — Leydig, Voit & Mayer, Ltd.

(57) ABSTRACT

A media player has a body, and an operating circuit with speakers. A support is attached to the body for movement between a retracted position, retracted at least partially within the body, and an extended position, extending from the body. The support incorporates a connector for, in the extended position, mechanically connecting and supporting a media playing device adjacent the body and electrically connecting an internal playing circuit of the media playing device to the operating circuit of the media player for operation of the media playing device via the operating circuit of the media player. A holder attached to the body engages the media playing device connected to the support, holding the media playing device in position.

16 Claims, 9 Drawing Sheets

MEDIA PLAYER

The present invention relates to a media player which can operate with a relatively smaller media playing device such as, in particular but not exclusively, an iPod.

BACKGROUND OF THE INVENTION

Small portable music players, such as iPods or equivalent (mp3) playing devices, become ever increasingly popular. Most of such music playing devices do not have built-in speakers and require the use of a pair of earphones, or the speakers are inadequate as limited by size. Docks are available on the markets for connecting such music playing devices by a cable to a larger audio or Hi-Fi system which incorporates a pair of larger, better quality speakers. These docks are good for use at a certain location but not on the go.

The invention seeks to mitigate or at least alleviate such a problem by providing a new or otherwise improved media (or multimedia) player.

SUMMARY OF THE INVENTION

According to the invention, there is provided a media player comprising a body, and an operating circuit with at least one speaker for performing operation of the media player. A support is attached to the body for movement between a retracted position retracted at least partially within the body and an extended position extending from the body. The support incorporates a connector for, in the extended position, mechanically connecting and thus supporting a relatively smaller media playing device adjacent the body and electrically connecting an internal playing circuit of a said media playing device to the operating circuit of the media player for operation of a said media playing device via the operating circuit of the media player. There is also a holder attached to the body for engaging a said media playing device connected by the support, thereby holding a said media playing device in position.

Preferably, the holder is provided at a distance apart from the support for engaging a second end of a said media playing device which is connected at a first end by the support.

More preferably, the holder is adjustable in position relative to the support for holding a said media playing device of different sizes.

Further more preferably, the holder is slidably attached to the body, being slidable in a direction towards and away from the support.

Yet further more preferably, the holder is slidably attached to the body for movement at right angles to the support in the extended position.

Yet further more preferably, one of the body and the holder includes a spring-loaded member for resiliently engaging the other of the body and the holder to thereby assist in maintaining the holder in position relative to the body.

It is preferred the holder has a recess for engaging upon a said media playing device, the recess having different widths to fit therein a part of a said media playing device of different thicknesses.

In a preferred embodiment, the support is pivotably attached to the body for pivotal movement between the retracted position and the extended position.

More preferably, the support is pivotable between the retracted position lying alongside the body and concealing the connector and the extended position protruding at right angles from the body and exposing the connector.

More preferably, the support is acted upon by a resilient member in the body to stay in the extended position.

In a preferred embodiment, the connector lies on an imaginary horizontal plane for mechanically connecting and thus supporting a said media playing device in a horizontal position for operation, with the holder holding a said media playing device stable in the horizontal position.

More preferably, the body is flat for use flat on a horizontal surface, the body having a lateral side along which the support and the holder are attached.

It is preferred the support in the retracted position and the holder protrude from the body, and a guard is attached to the body adjacent and overlapped with the support and the holder to protect the support and the holder from hitting in a lateral direction.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
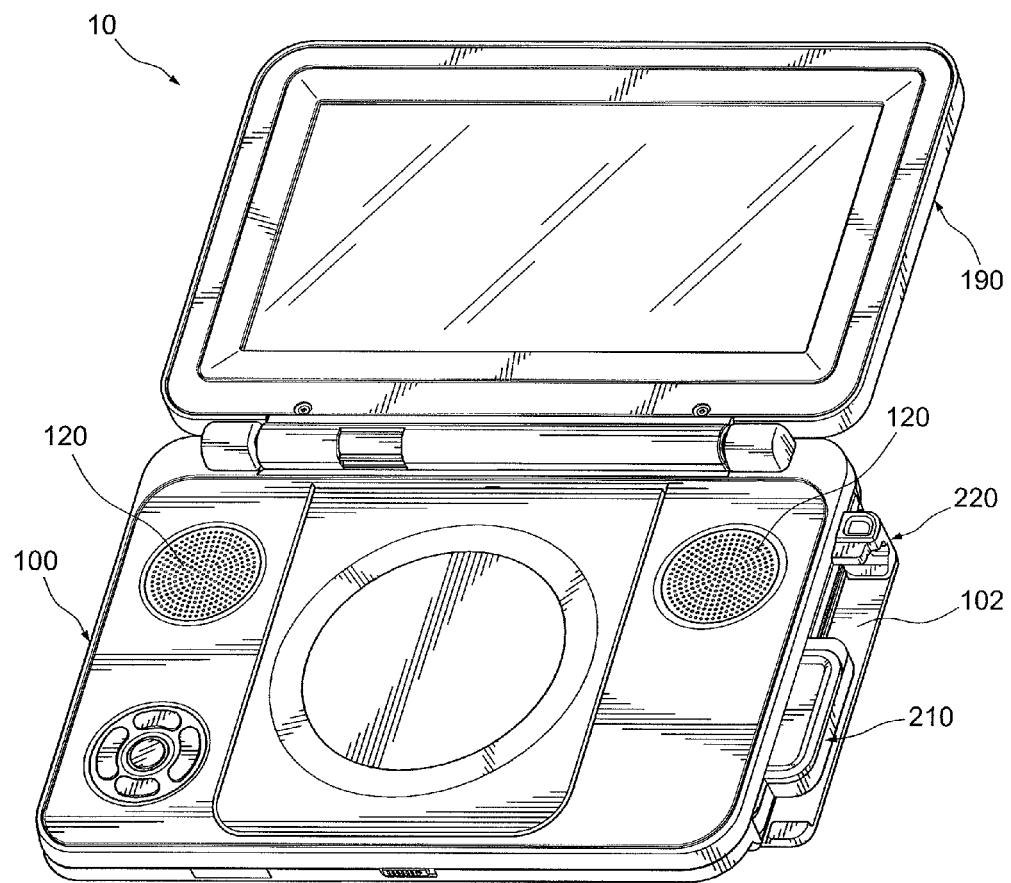
FIG. 1 is a perspective view of an embodiment of a media player in accordance with the invention, which includes a support and holder for mechanically and electrically connecting a relatively smaller media playing device such as an iPod.
Figure 2:
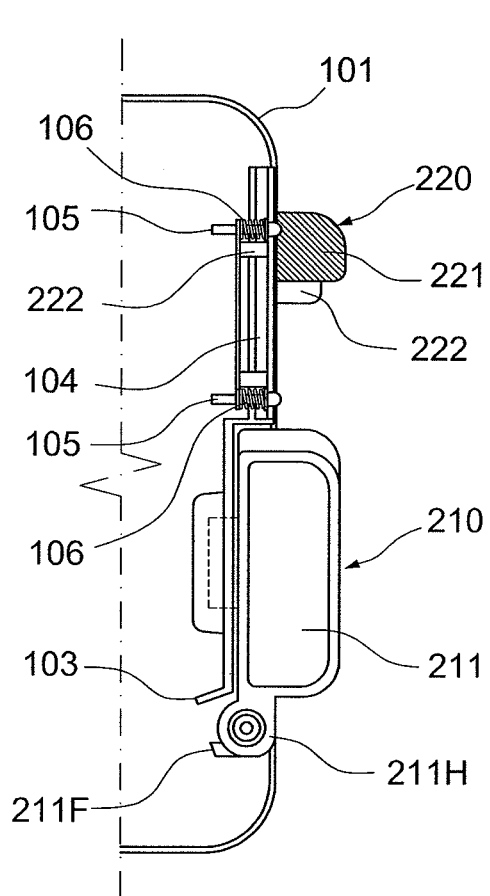
FIG. 2 is a schematic plan view of a right side of the media player of FIG. 1, showing the support and holder with relevant internal details.
Figure 3:
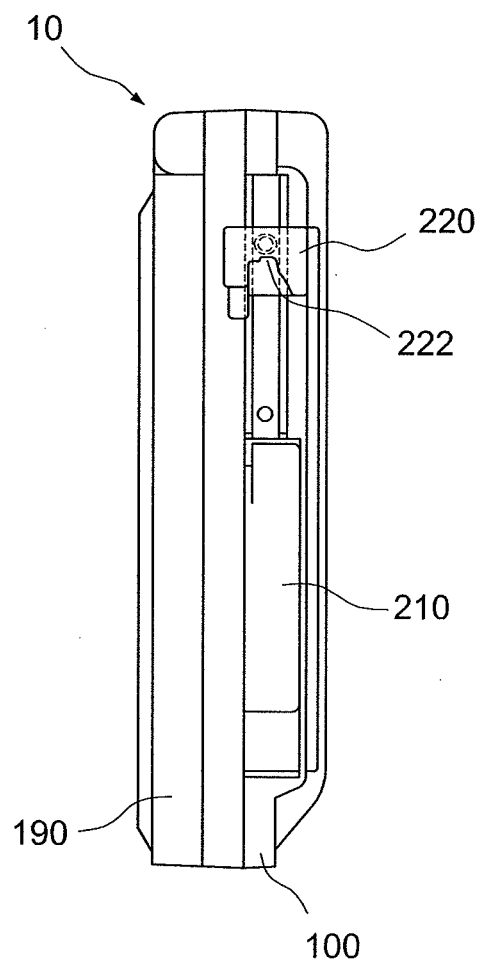
FIG. 3 is a right side view of the media player of FIG. 1, showing the support and holder.
Figure 4:
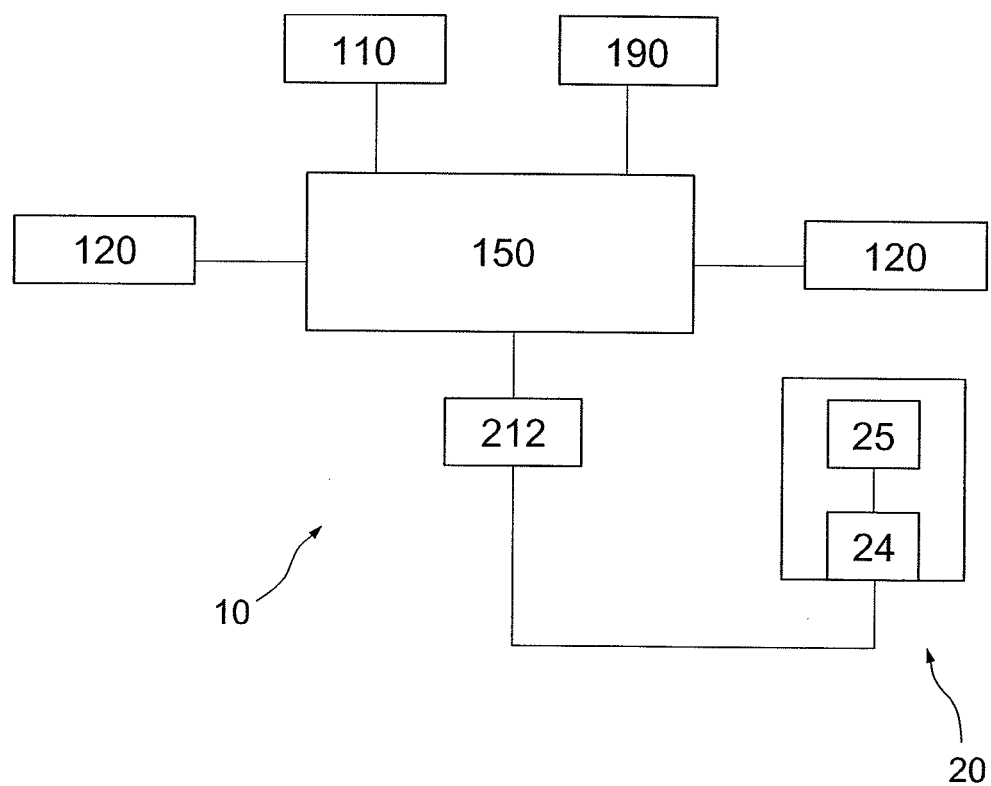
FIG. 4 is a schematic function block diagram of the media player of FIG. 1 and an iPod connected thereto.

Referring to the drawings, there is shown a media (or multimedia) player in the form of a portable DVD player 10 embodying the invention. The DVD player 10 has a flat body 100 and an LCD screen 190 hinged to the body 100 at the back, for use flat on a horizontal surface, such as a desktop, like a laptop/notebook computer. In the body 100 there are a disc transport/playing mechanism 110 and a pair of left and right speakers 120, as well as an operating circuit 150 electrically connected to the disc transport/playing mechanism 110 and the speakers 120 for controlling the same, together performing general DVD operations.

The DVD player 10 is designed such that it is capable of use with a relatively smaller media playing device such as a portable mp3 player or in this particular embodiment an iPod 20, which typically does not include an internal speaker(s) and therefore usually requires a pair of earphones to listen to. In this regard, the DVD player 10 offers its built-in speakers 120 and related parts of the operating circuit 150, such as amplifier and driver circuits, for outputting the songs, music or sound played by the iPod 20. The DVD player 10 may also offer its LCD screen 190, via relevant parts of the operating circuit 150, for displaying visual content and/or signal output by the iPod 20.

The iPod 20, as is generally known in the art, has a flat rectangular body 21, an LCD screen 22 occupying an upper half of the body 21, a set of user controls 23 over the lower half, an I/O port 24 in the bottom end, and an internal playing circuit 25 for operation and control, etc.

For mounting the iPod 20, the DVD player 10 is equipped, along the right side 101 of its body 100, with a support 210 which acts as a dock for the iPod 20 but supporting it in a flat down horizontal position and a holder 220 which holds and keeps the iPod 20 in position at the dock.

The support 210 takes the form of a short horizontal bar 211 and incorporates a standard 30-pin plug connector 212 for iPods, which protrudes laterally along one side i.e. the rear side of the bar 211. The connector 212 lies on an imaginary horizontal plane for mechanically connecting and thus supporting the iPod 20 in a horizontal position for operation.

Figure 5:
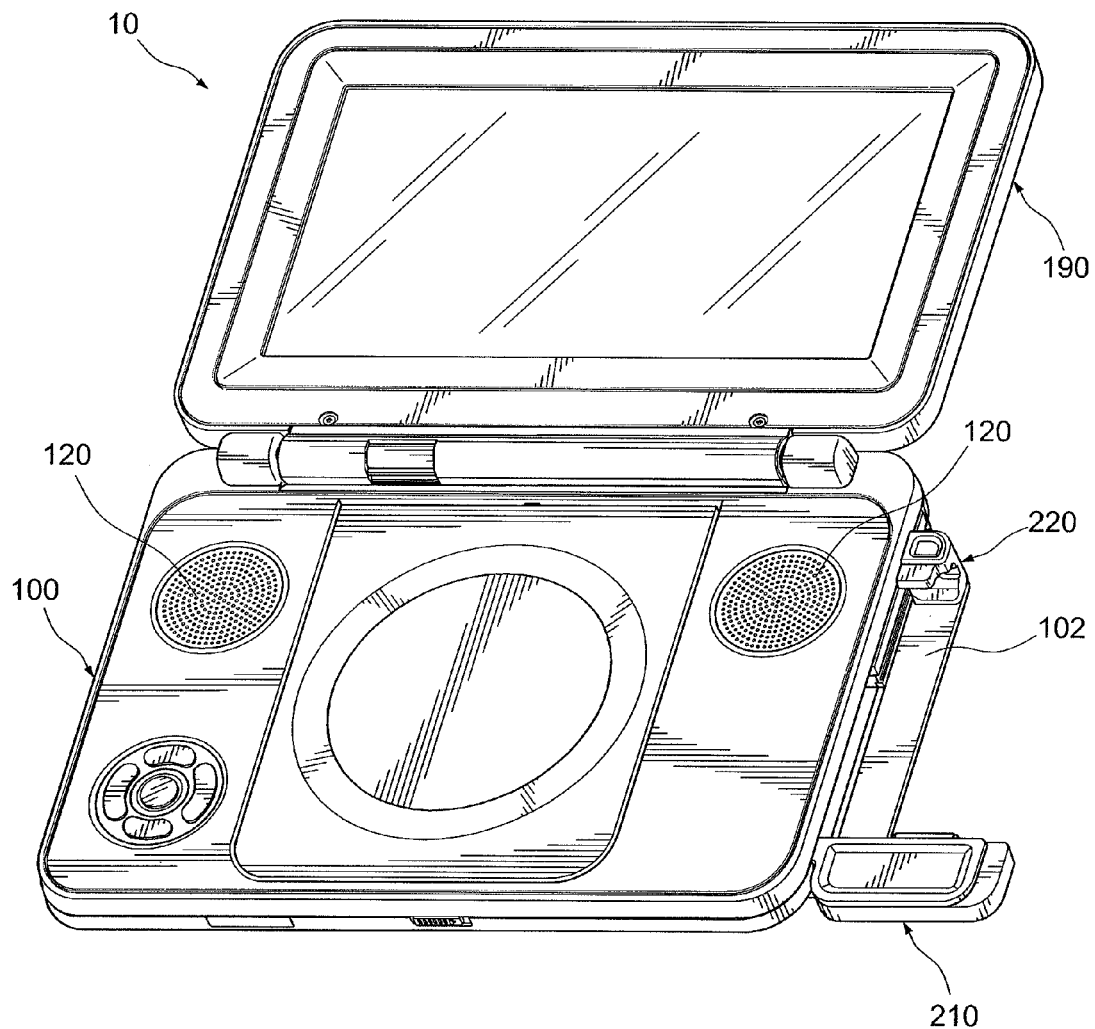
FIG. 5 is a perspective view of the media player of FIG. 1, showing the support extended.

The support 210 is pivotably attached at one end 211H to the right side 101 of the body 100. It is hinged for pivotal movement about a vertical axis between a retracted position retracted (at least) partially within the body 100 (FIG. 1) and an extended position extending from the body 100 (FIG. 5).

In the retracted position, the support 210 extends alongside the body 100 and conceals the connector 212 within the body's right side 101. In the extended position, the support 210 projects at right angles from the body's right side and reveals the connector 212, which then faces horizontally to the rear.

Figure 6:
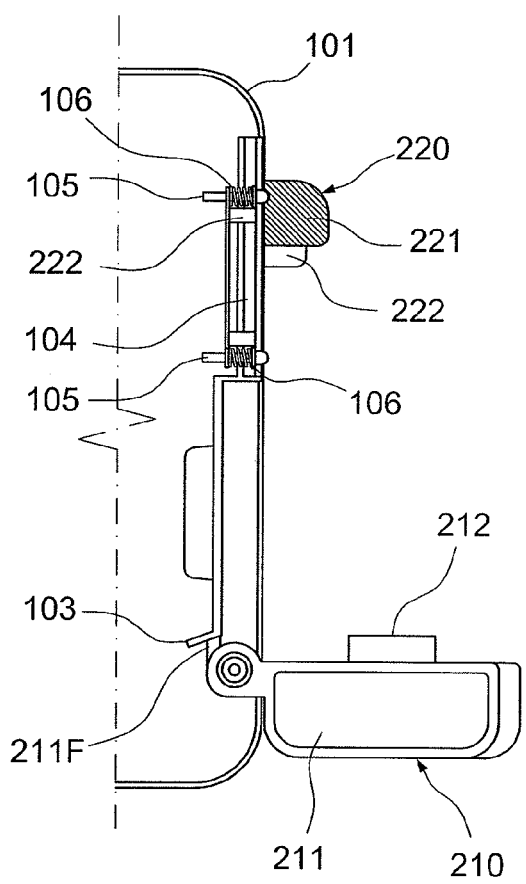
FIG. 6 is a schematic plan view of a right side of the media player of FIG. 5, showing the support and holder with relevant internal details.
Figure 7:
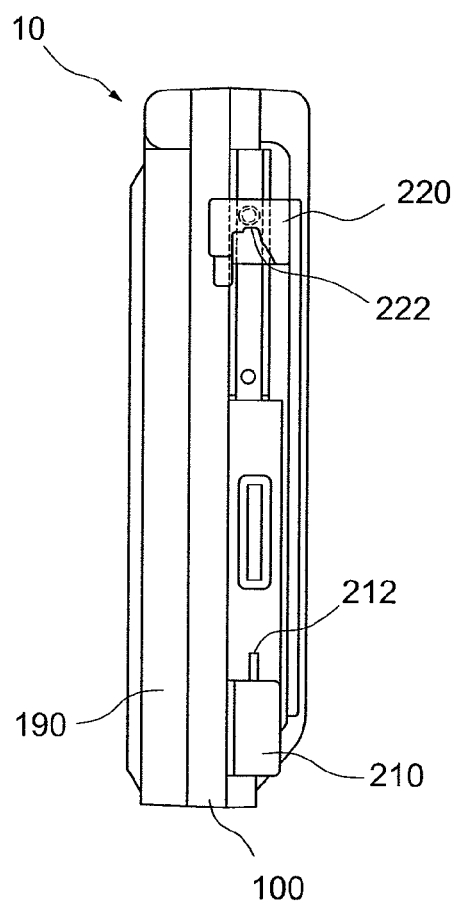
FIG. 7 is a right side view of the media player of FIG. 5, showing the support and holder.
Figure 8:
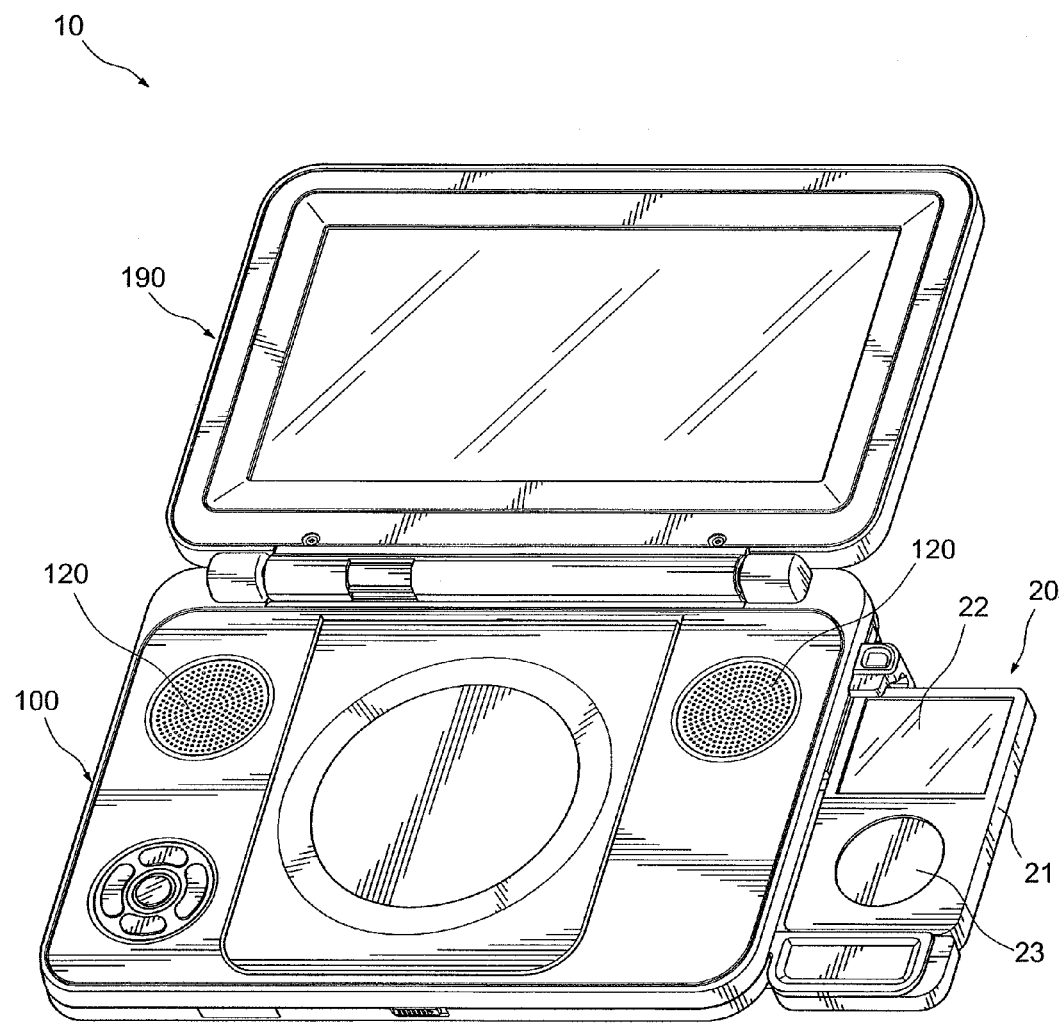
FIG. 8 is a perspective view of the media player of FIG. 1, showing the support extended and supporting an iPod in conjunction with the holder.

There is a small flat platelet 103 within the right side 101 of the body 100, which is resiliently deflectable by virtue of the elasticity of its material (e.g. plastics) or is acted upon by a spring. The bar 211 has a small projected flat face 211F at its end 211H adjacent the platelet 103. As the bar 211 is pivoted outwards, its face 211F is turned to bear flat against the platelet 103, which recedes temporarily, to thereby hold the support 210 to stay in the extended position under the action of resilience of the platelet 103 (see FIG. 6 for example). A small force is required to turn the support 210 into, and later out of, the extended position, sufficiently large for the bar's face 211F to push the platelet 103 back (through flexing of the rear behind the platelet 103) immediately before the face 211F turns to or away from the platelet 103.

The pins of the connector 212 are electrically wired to the relevant parts of the operating circuit 150 as is generally known in the art, for example via equivalent standard USB port connections. The iPod 20 may be plugged at its I/O port 24 with the connector 212 in order to connect its internal playing circuit to the DVD operating circuit 150, thereby forming part of the DVD player 10 for output of audio content as well as video and/or image content (e.g. photographs) where appropriate.

With the iPod 20 unplugged, the support 210 may be folded back into the right side of the body 100 for mechanical protection and to protect the connector 212 against dust. The support 210 will remain laterally protruding in the retracted position, with the result that it can easily be grabbed for unfolding.

While mounted the iPod 20 is connected to the DVD player 10 electrically as well as mechanically such the iPod 20 is mounted on and integrated with the DVD player 10. The support 210 is designed to locate the iPod 20 horizontally co-planar with and alongside the body 100 for a matching and non-obtrusive arrangement such that, in particular, the LCD screen 190 may be folded and closed down upon the body 100 without being obstructed by the iPod 20.

While mounted the iPod 20 extends horizontally out from the support 210 in a cantilevered manner which would be unstable but the holder 220 holds the otherwise free opposite top end of the iPod 20.

The holder 220 is provided by a generally flat square knob 221 having a stem 222 which is slidably attached in a track 104 provided in and along the right side 101 of the body 100. The knob 221 protrudes from the right side 101 of the body 100 to about the same extent as the retracted support 210. The track 104 runs rearwardly from next to the retracted support 210 to near the rear of the body 100. The knob 221 is slidable along the track 104 in opposite directions towards and away from the support 210, at right angles to the extended support 210.

The holder 220 is spaced at a certain distance apart from the extended support 210 for engaging the left corner at the top end of the iPod 20, when the iPod 20 is located at its bottom end by the support 210. This arrangement ensures that the iPod 20 will be supported/held at opposite ends and thus mounted horizontally in a stable manner.

As is known, iPods are available at various sizes amongst different models. The holder 220 is slidable and thus adjustable in position relative to the support 210 to fit iPods of different sizes and in particular different lengths across top and bottom ends. The connector 212 is located along the support 212 to accommodate the widest of the intended models of iPods.

To engage the top left corner of the iPod 20, the holder knob 221 is made with a recess 222 which faces in the direction of the support 210 and has a generally V-shaped cross-section or a generally increasing width in that direction i.e. from the bottom of the recess 222 outwards. Such a cross-sectional shape enables the recess 222 to receive and engage upon, and fit therein, the top left corner of iPods of different thickness (i.e. amongst different models of iPods) by its back and front for stable holding.

At or about each of the opposite ends of the track 104, there is provided a spring-loaded pin 105 which has a round end protruding slightly out from the right side 101 of the body 100. Both pins 105 are resiliently biased outwards by respective compression coil springs 106 which are made from opposite ends of a metal wire. The round end of each pin 105 serves to resiliently engage the inner wall of the holder knob 221, by a respective small dent in the said wall (though not shown in the drawings), to thereby assist in maintaining the holder 220 stably in a respective predefined position relative to the body 100 i.e. the support 210.

Figure 9:
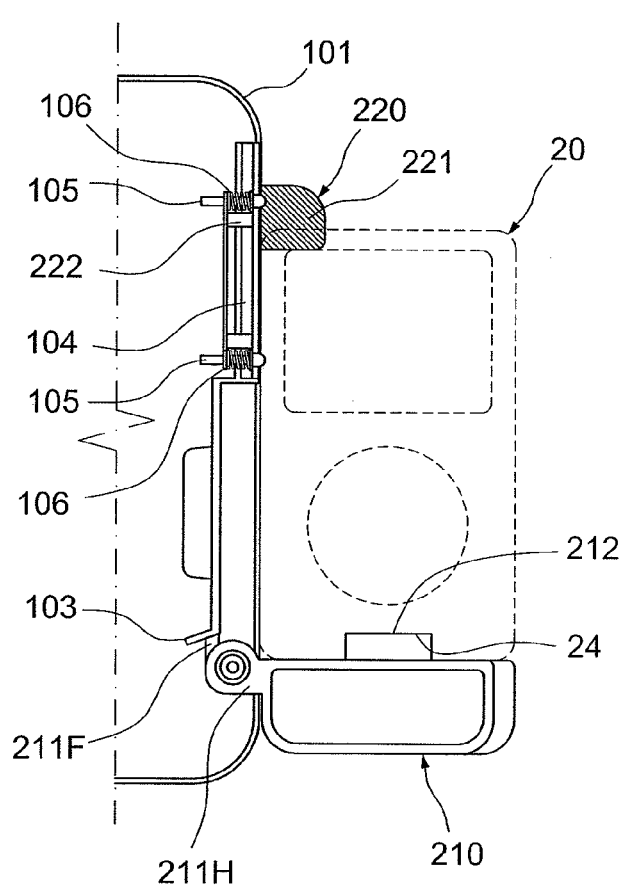
FIG. 9 is a schematic plan view of a right side of the media player and iPod of FIG. 8, showing the support and holder with relevant internal details.
Figure 10:
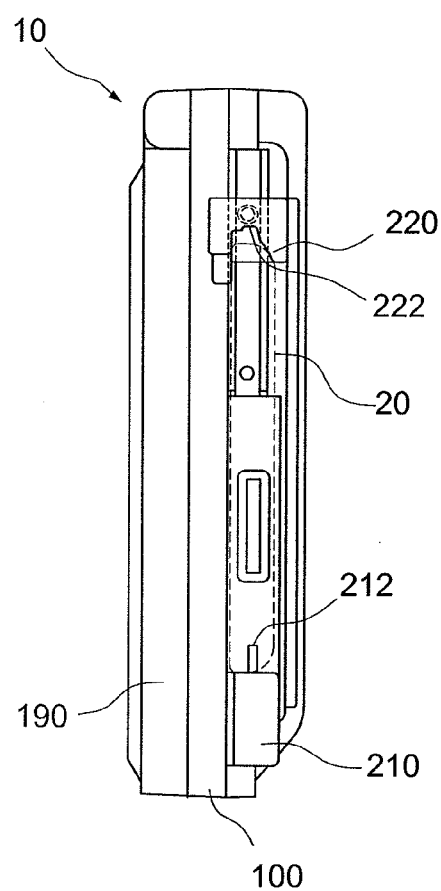
FIG. 10 is a right side view of the media player and iPod of FIG. 8.
Figure 11:
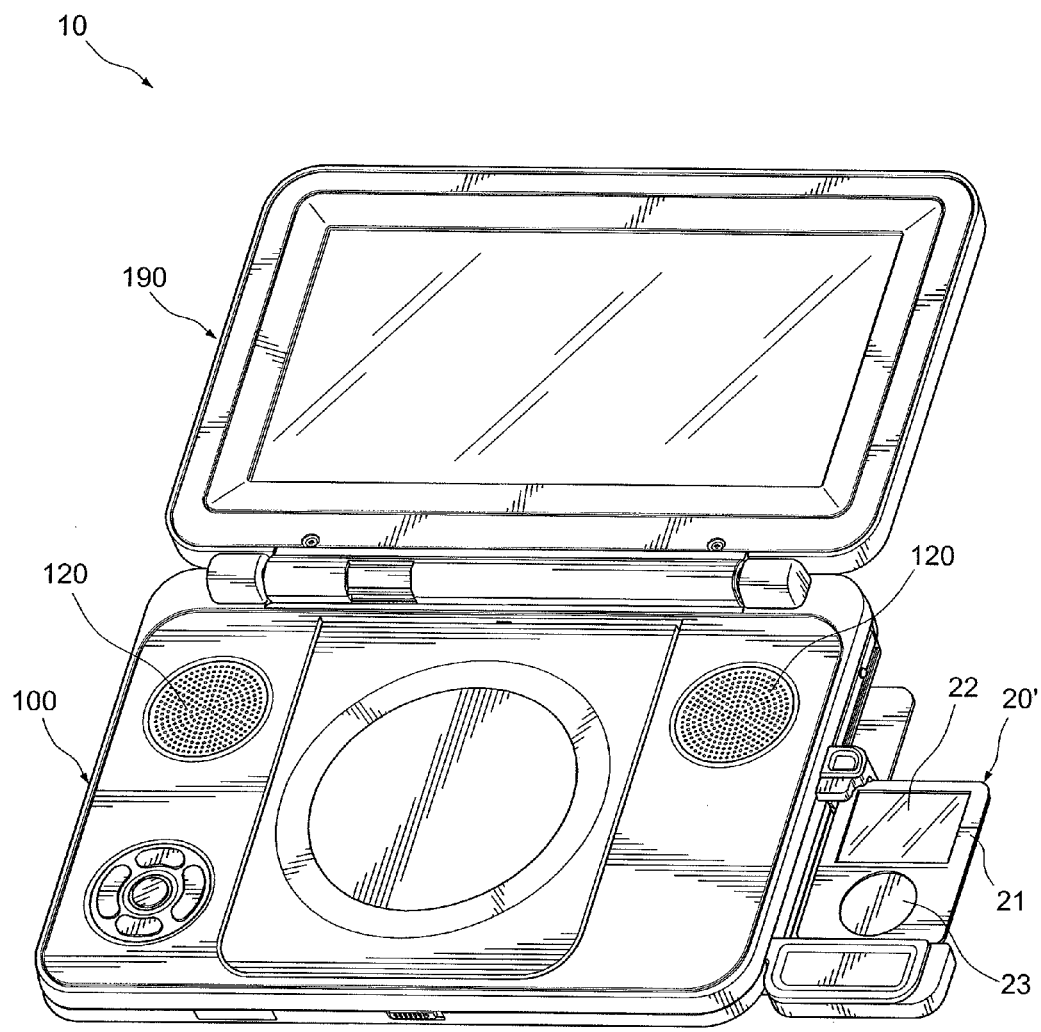
FIG. 11 is a perspective view of the media player of similar to FIG. 8, showing the support extended and supporting another iPod of a relatively larger size in conjunction with the holder at a different position.
Figures 12, 13:
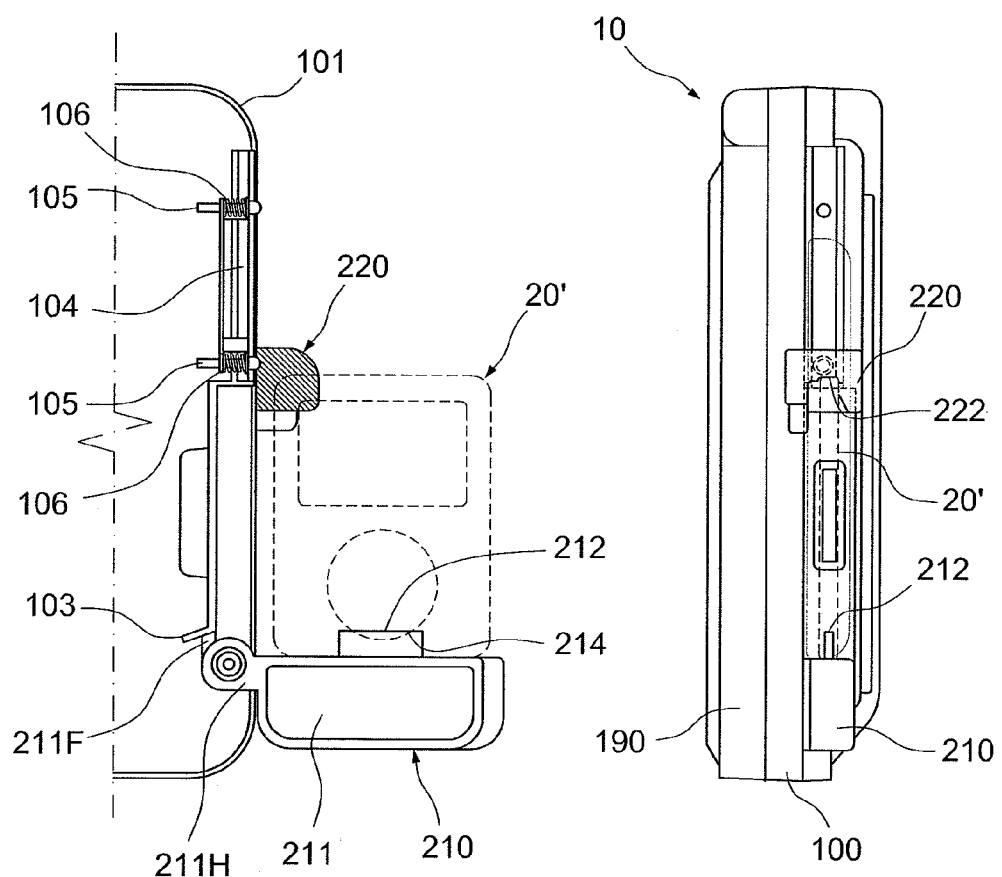
FIG. 12 is a schematic plan view of a right side of the media player and iPod of FIG. 11, showing the support and holder with relevant internal details.
FIG. 13 is a right side view of the media player and iPod of FIG. 11.

There are two such predefined positions. The farther position from the support 210 is for holding the iPod 20 of a relatively larger size (FIG. 9), and the nearer position to the support 210 is for matching an iPod 20' of a relatively smaller size (FIG. 12).

The holder 220 may be slid by a small force to disengage from one pin 105 at an original position and then engage with the other pin 105 at the opposite position.

It is envisaged that the holder 220 may incorporate a similar spring-loaded pin or protuberance for engaging one of a series of dents along the right side 101 of the body 100 for defining two or more stable positions to fit various models of iPods. This reduces part count. In general, the holder 220 is retarded against sliding (at certain positions) under the action of a spring such that the holder 220 has a tendency to stay put.

A flat oblong fixed guard 102 is attached to the right side 101 of the body 100 adjacent the support 210 and holder 220 i.e. immediately underneath and overlapped with the support 210 and holder 220 for protecting the retracted support 210 and the holder 220 from hitting in a lateral direction especially from below.

The media player embodying the subject invention may be a disc player as described above, and other examples include a notebook computer, a laptop or a netbook.

The invention provides a retractable dock in a media or multimedia player, which acts as a convenient and all time available base for playing iPods or the like, such that music and/or video (or photographs) can be played with better sound or on a larger screen on the go using the media/multimedia player.

The invention has been given by way of example only, and various other modifications of and/or alterations to the described embodiment may be made by persons skilled in the art without departing from the scope of the invention as specified in the appended claims.

What is claimed is:

1. A media player comprising:
   a body having a main surface and at least one side that is transverse to the main surface;
   at least one speaker located within the body and exposed at the main surface of the body for reproducing sound;
   an operating circuit located within the body for operating the media player;
   a support including an electrical connector electrically connected to the operating circuit and for electrically and mechanically connecting a media playing device to the operating circuit, wherein
      the media playing device has opposite first and second ends, and
      the support is pivotally attached to the side of the body and pivots about an axis that is transverse to the main surface, between
         a storage position, in which the support is aligned with the side of the body and the electrical connector is concealed within the body, and
         a support position, in which the support is transverse to the side of the body and the electrical connector is exposed from the body for mechanically supporting, adjacent the side of the body, a first end of the media playing device that is electrically connected to the electrical connector; and
   a holder attached to the side of the body and spaced from the support for engaging and supporting a second end of the media playing device that is connected to the electrical connector, thereby holding the media playing device in position at the side of the body.

2. The media player as claimed in claim 1, wherein the holder is adjustable in position along the side of the body and relative to the support for holding media playing devices of different sizes.

3. The media player as claimed in claim 2, wherein the holder is slidably attached to the side of the body, and is slidable towards and away from the support.

4. The media player as claimed in claim 3, wherein one of the body and the holder includes a spring-loaded member resiliently engaging the other of the body and the holder and assisting in maintaining the holder in position relative to the body.

5. The media player as claimed in claim 1, wherein
   the holder has a recess for engaging the second end of the media playing device connected to the electrical connector, and
   the recess has multiple widths for engaging media playing devices of different thicknesses.

6. The media player as claimed in claim 1 including a resilient member located within the body for maintaining the support in the support and storage positions.

7. The media player as claimed in claim 1, wherein the connector, the support, and the holder mechanically connect and support the media playing device parallel to the main surface for operation.

8. The media player as claimed in claim 1 including a guard attached to the body, adjacent, directly opposite, and below, with respect to the main surface, the support and the holder, protecting the support and the holder from colliding with objects below the body.

9. The media player as claimed in claim 1 including a display screen pivotally attached to the body, wherein the display screen pivots with respect to the body about an axis that is generally parallel to the main surface of the body and is transverse to the axis of pivoting of the support with respect to the body.

10. The media player as claimed in claim 9, wherein the holder is adjustable in position along the side of the body and relative to the support for holding media playing devices of different sizes.

11. The media player as claimed in claim 10, wherein the holder is slidably attached to the side of the body, and is slidable towards and away from the support.

12. The media player as claimed in claim 11, wherein one of the body and the holder includes a spring-loaded member resiliently engaging the other of the body and the holder and assisting in maintaining the holder in position relative to the body.

13. The media player as claimed in claim 9, wherein
   the holder has a recess for engaging the second end of the media playing device connected to the electrical connector, and
   the recess has multiple widths for engaging media playing devices of different thicknesses.

14. The media player as claimed in claim 9 including a resilient member located within the body for maintaining the support in the support and storage positions.

15. The media player as claimed in claim 9, wherein the connector, the support, and the holder mechanically connect and support the media playing device parallel to the main surface for operation.

16. The media player as claimed in claim 9 including a guard attached to the body, adjacent, directly opposite, and below, with respect to the main surface, the support and the holder, protecting the support and the holder from colliding with objects below the body.

* * * * *